United States Patent [19]

Burrahm

[11] Patent Number: 5,775,309

[45] Date of Patent: Jul. 7, 1998

[54] PRE-ADJUSTABLE FUELING SYSTEM FOR DUAL FUEL ENGINE

[75] Inventor: Robert Burrahm, Placentia, Calif.

[73] Assignee: IMPCO Technologies, Inc., Seattle, Wash.

[21] Appl. No.: 892,039

[22] Filed: Jul. 14, 1997

[51] Int. Cl.⁶ ............................................. F02B 43/00
[52] U.S. Cl. ............................................. 123/575; 123/527
[58] Field of Search ............................ 123/527, 575–579

[56] References Cited

U.S. PATENT DOCUMENTS

| | | | |
|---|---|---|---|
| 4,416,244 | 11/1983 | McDonald | 123/577 |
| 4,489,699 | 12/1984 | Poehlman | 123/575 |
| 4,535,728 | 8/1985 | Batchelor | 123/575 |
| 4,574,763 | 3/1986 | Hallberg | 123/577 |
| 4,589,397 | 5/1986 | Stankewitsch | 123/527 |
| 4,638,783 | 1/1987 | Snyder | 123/527 |

FOREIGN PATENT DOCUMENTS

| | | | |
|---|---|---|---|
| 2 622 638 | 5/1989 | France | 123/575 |
| 40 15 411 | 11/1991 | Germany | 123/575 |

*Primary Examiner*—Erick R. Solis
*Attorney, Agent, or Firm*—Edward A. Sokolski

[57] ABSTRACT

A fuel control unit which is formed in a housing such as a load block or carburetor has a passageway with a fuel inlet at one end thereof and a fuel outlet at the other end thereof. A pair of adjusting valves, one for adjusting the amount of fuel flow from a first fuel source such as natural gas and the other for adjusting the amount of fuel flow from a second fuel source such as propane are mounted in the passageway. The valves are positioned to set the sizes of metered passages and are preadjusted to provide the desired fuel flow to provide a proper air to fuel ratio for the fuel from each source. The passageway is alternatively set for proper operation with one or the other fuel sources either by manually positioning a shuttle valve or actuating a solenoid which drives the shuttle valve.

10 Claims, 3 Drawing Sheets

5,775,309

1

PRE-ADJUSTABLE FUELING SYSTEM FOR DUAL FUEL ENGINE

BACKGROUND OF THE INVENTION

1. Field of the Invention

This invention relates to fueling systems for dual fuel engines and more particularly to such a system which can be pre-adjusted for each fuel and switched to operate with one or the other of such fuels.

2. Description of the Related Art

Dual fuel engines which can operate alternatively on one fuel or another are quite often used particularly in a situation where there may be an interruption in the supply of fuel from a primary source and a secondary source is available for temporary use until the primary fuel is again available. Such engines often employ two different gasses such as natural gas and propane or LPG. It is important that the air to fuel ratios be properly adjusted for each fuel to assure good engine performance and to minimize exhaust emissions. As the fuels employed, e.g. natural gas and propane, generally have different densities, BTU content on a mass or volume basis, wobie index, and viscosity, it is necessary to readjust the carburetor or other fuel metering device when changing from one fuel to another. This is generally done by adjusting a screw often referred to as a "load screw" located in the carburetor or in a separate device known as a load block which sets the amount of fuel flow.

Prior art internal combustion engine systems employing dual fuels are described in U.S. Pat. No. 4,535,728 issued Aug. 20, 1985 to Batchelor, U.S. Pat. No. 4,416,244 issued Nov. 22, 1983 to McDonald and U.S. Pat. No. 4,489,699 issued Dec. 25, 1984 to Poehlman. In the Batchelor patent, a supplemental gaseous fuel is fed to the engine simultaneously with the main liquid fuel, with the gaseous fuel being regulated automatically in response to engine conditions. McDonald describes a system in which two separate fuel supplies are alternatively fed to the engine by actuating a control switch which controls a solenoid. One of the fuels is a liquid fuel, the other is a combination of this liquid fuel and a gaseous fuel. In this system, the ratio of the fuels is automatically controlled in response to engine operating parameters. In the Poehlman patent, either a liquid or gaseous fuel is fed to the engine by actuating an electrical solenoid which operates to alternatively feed one or the other of the fuels to the engine. There is no teaching in this reference of the valve operation for each fuel and the fuel flow is regulated automatically. There is no teaching in the prior art of a simple manually adjusted valving system which is preset to provide the proper air to fuel ratio for each of two fuels and in which one or the other of the preset arrangements may be alternatively set up in the fuel passageway by a simple manual adjustment or by actuating a solenoid.

BRIEF SUMMARY OF THE INVENTION

The present invention provides a system in which the air to fuel ratio of the fuel for operating an engine can rapidly and simply be changed for operation with one fuel or another by manually actuating a control valve or actuating this valve by means of a solenoid. A housing which may be formed in a load block or a carburetor has a fuel passageway formed therein with a fuel inlet at one end and a fuel outlet at the other end. First and second valves are positioned in the passageway, these valves each being manually adjusted to preset the size of an associated metering passage. The passageway is set to provide the proper air to fuel ratio for

2 one fuel or the other by alternatively closing one of the metering passages or leaving such metering passage open. This end result may be achieved by either a manually or solenoid positioned shuttle valve or by driving the first valve by means of a solenoid so that it closes its associated metering passage.

It is therefore an object of this invention to facilitate the changing of the fuel supply for an engine.

It is a further object of this invention to provide a simple system which can be used to alternatively feed either one fuel or another to an engine with the air to fuel ratio for each fuel being properly set.

Other objects of the invention will become apparent in view of the following description in connection with the accompanying drawings.

DETAILED DESCRIPTION OF THE INVENTION

Figure 1:
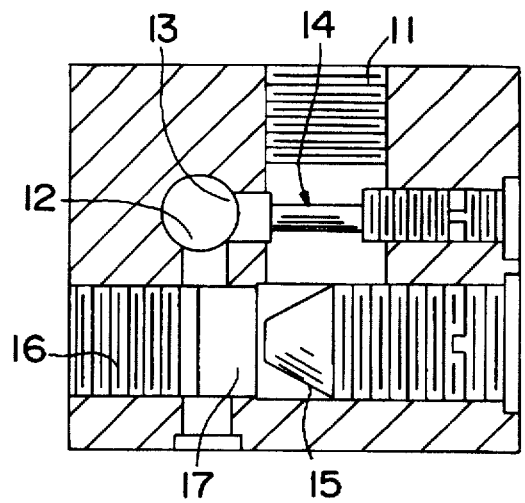
FIG. 1 is a cross sectional view illustrating a manually operated embodiment of the invention which may be incorporated into a load block.
Figure 2:
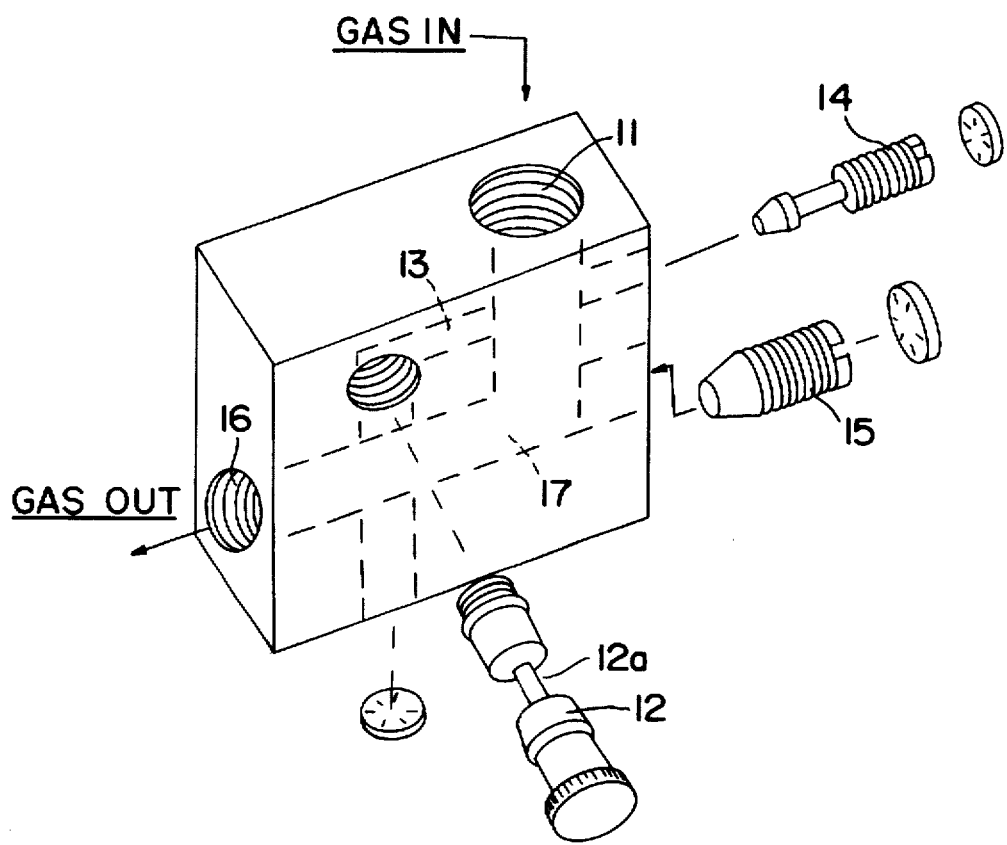
FIG. 2 is an exploded view of the embodiment of FIG. 1.

Referring to FIGS. 1 and 2, a first embodiment of the invention having its housing incorporated into a load block is illustrated.

A passageway is formed in the load block between inlet 11 and outlet 16. Fuel which may be either the regular fuel such as natural gas or an auxiliary fuel such as propane is fed into the load block through inlet 11 and fed out through outlet 16. When the regular fuel is being employed, shuttle valve 12 is manually positioned to provide an opening in passage 13 through the undercut portion 12a of the valve. With the shuttle valve positioned to close passage 13, the unit is set for operation with the auxiliary fuel. To provide a proper air to fuel ratio for the regular fuel, screw valve 14 is adjusted to preset metering passage 13 when shuttle valve 12 is in its open position, i.e. with passage 13 open. Screw valve 15 is adjusted with the shuttle valve 12 in its closed position, i.e. with passage 13 closed to preset metering passage 17 to provide the proper air to fuel ratio for the auxiliary fuel. With the shuttle valve 12 in its open position fuel is metered through to the outlet 16 through both metering passages 13 and 17 to outlet 16 while with shuttle valve 12 in its closed position, the fuel is fed solely through metering passage 17.

Figure 3:
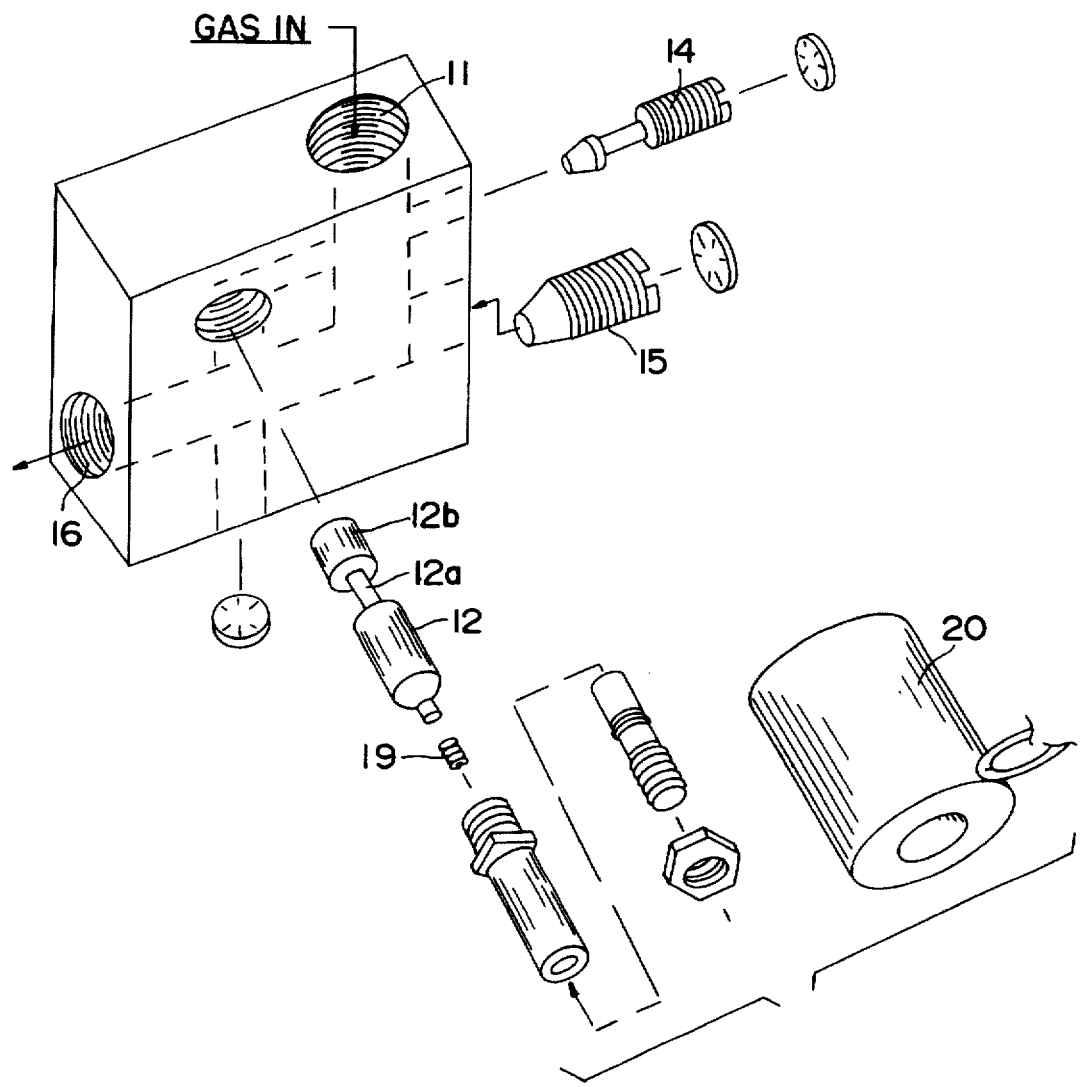
FIG. 3 is an exploded view of a solenoid actuated embodiment of the invention which may be incorporated into a load block.

Referring now to FIG. 3, an embodiment of the invention employing a solenoid actuated shuttle valve is illustrated. This embodiment is the same as the first embodiment except that rather than being hand operated, the shuttle valve 12 is driven by a solenoid. As the operation is otherwise the same like numerals have been used to identify like parts. The shuttle valve 12 is normally kept in its "open" position, i.e. with the undercut portion 12a opposite passage 13 so as to pass fuel through the passage, this by virtue of the biasing action of spring 19. When the solenoid is actuated, the shuttle valve is driven against the spring bias to bring the distal portion 12b of the shuttle valve opposite passage 13 so as to close this passage.

Figure 4:
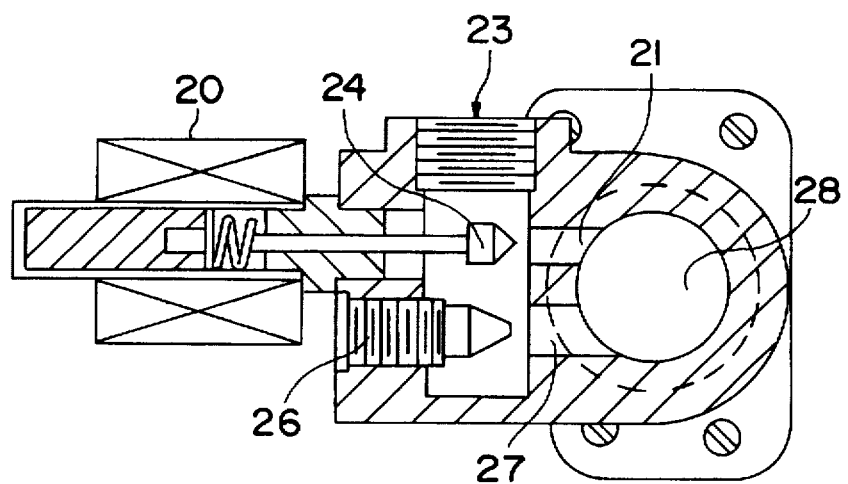
FIG. 4 is a cross sectional view of a second embodiment of the invention employing a solenoid which is incorporated into a carburetor.

Referring now to FIG. 4, a second embodiment of the invention is shown. In this embodiment, the housing for the device of the invention is formed in a carburetor. The fuel is fed in through inlet 23 and fed into the venturi 28 of the carburetor. Metering passages 21 and 27 are provided which are respectively set to provide the proper air to fuel ratio for each fuel by manually adjusting screw valves 24 and 26 respectively. Solenoid 20 when actuated drives screw valve 24 so that it closes metering passage 21. With the solenoid not energized so that screw valve is in the position shown in FIG. 4, valve screw 24 is adjusted to provide the proper air to fuel ratio for the regular fuel. It is to be noted that in this mode of operation the fuel is metered through both passages 21 and 27. With the solenoid energized to cause screw valve 24 to close passage 21, screw valve 26 is adjusted to provide the proper air to fuel ratio for the auxiliary fuel. In this manner, the proper air to fuel ratio for each of the fuels is preset so that with the solenoid not actuated, the setting is correct for the regular fuel and with the solenoid actuated, the setting is correct for the auxiliary fuel.

The invention thus provides a simple and economical system for setting the air to fuel ratio for two different fuels and rapidly switching over for operation with one or the other of such fuels.

While the invention has been described and illustrated in detail, it is to be clearly understood that this is intended by way of illustration and example only and is not to be taken by way of limitation, the scope of the invention being limited only by the terms of the following claims.

I claim:

1. A system for setting the air to fuel ratio for each of two different engine fuels comprising:
    a housing having a passageway formed therein and a fuel inlet at one end of said passageway and a fuel outlet at the other end of said passageway;
    first and second metering passages formed in said passageway;
    a first valve positioned in said passageway opposite said first metering passage, said first valve being manually adjustable to set the size of said first metering passage;
    a second valve positioned in said passageway opposite said second metering passage, said second valve being manually adjustable to set the size of said second metering passage, and
    means for selectively either closing one of said passages or leaving said one of said passages open,
    whereby with said one of said passages closed, the air to fuel ratio is properly set for one of said fuels and with said one of said passages open, the air to fuel ratio for the other of said fuels is properly set.

2. The system of claim 1 wherein said means for either closing said one of said passages or leaving said one of said passages open comprises a manually positionable shuttle valve.

3. The system of claim 1 wherein said means for either closing said one of said passages or leaving said one of said passages open comprises a shuttle valve and a solenoid for driving said shuttle valve.

4. The system of claim 1 wherein said housing is formed by a load block.

5. the system of claim 1 wherein said housing comprises a portion of a carburetor.

6. The system of claim 5 wherein said means for either closing said one of said passages or leaving said one of said passages open comprises a solenoid for selectively driving one of said valves between a first position whereat said one of said passages is open and a second position whereat said one of said passages is closed.

7. A system for setting the air to fuel ratio for each of two different engine fuels comprising:
    a load block having a passageway formed therein, a fuel inlet at one end of said passageway and a fuel outlet at the other end of said passageway;
    first and second metering passages formed in said passageway;
    first and second valves positioned in said passageway opposite said first and second passages respectively, said valves each being manually positionable to set the sizes of said first and second metering passages respectively; and
    a shuttle valve installed in said passageway and positionable between a first position whereat it closes one of said metering passages and a second position whereat said one of said metering passages is left open,
    whereby with the shuttle valve in the first position, the proper air to fuel ratio for one of said fuels is provided and with the shuttle valve in the second position, the proper air to fuel ratio for the other of said fuels is provided.

8. The system of claim 7 wherein said shuttle valve is manually positionable.

9. The system of claim 7 and further including a solenoid for positioning said shuttle valve.

10. A system for setting the air to fuel ratio for each of two different engine fuels comprising:
    a carburetor having a passageway formed therein, a fuel inlet positioned at one end of said passageway and a fuel outlet positioned at the other end of said passageway;
    first and second metering passages formed in said passageway;
    first and second adjustable valves positioned in said passageway opposite said first and second passages respectively, said valves each being manually adjustable to set the sizes of said first and second metering passages respectively; and
    a solenoid for driving said first valve between a first position whereat said first passage is open and a second position whereat said first passage is closed,
    the air to fuel ratio being properly set for one of said fuels when said first passage is closed and being properly set for the other of said fuels when said first passage is left open.

* * * * *